US008622481B2

(12) United States Patent
Niederriter et al.

(10) Patent No.: US 8,622,481 B2
(45) Date of Patent: Jan. 7, 2014

(54) FIBER OPTIC CABLE PROTECTION IN A MINING SYSTEM

(75) Inventors: Edward F. Niederriter, Fryburg, PA (US); Shawn W. Franklin, Emlenton, PA (US); James E. Haughey, Butler, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 197 days.

(21) Appl. No.: 13/013,627

(22) Filed: Jan. 25, 2011

(65) Prior Publication Data
US 2012/0187746 A1    Jul. 26, 2012

(51) Int. Cl.
E21C 27/20    (2006.01)
F16G 13/16   (2006.01)

(52) U.S. Cl.
USPC ............................................. 299/43; 59/78.1

(58) Field of Classification Search
USPC ...................... 299/42, 43, 47; 59/78.1; 248/49
See application file for complete search history.

(56) References Cited

U.S. PATENT DOCUMENTS

| | | |
|---|---|---|
| 1,384,153 A | 7/1921 | Roos |
| 1,940,701 A | 12/1933 | Shope |
| 1,940,702 A | 12/1933 | Shope |
| 2,034,267 A | 3/1936 | Nydegger |
| 3,197,954 A | 8/1965 | Merker et al. |
| 3,590,854 A * | 7/1971 | Cork ........................ 137/355.16 |
| 3,779,003 A | 12/1973 | Boissevain |
| 3,811,731 A | 5/1974 | Sann |
| 4,570,437 A | 2/1986 | Moritz |
| 4,669,507 A | 6/1987 | Moritz |
| 4,711,520 A | 12/1987 | Bernardini |
| 4,799,760 A | 1/1989 | Beatty et al. |
| 4,804,252 A | 2/1989 | Betzler et al. |
| 4,812,003 A | 3/1989 | Dambach et al. |
| 4,815,810 A | 3/1989 | Betzler et al. |
| 4,815,812 A | 3/1989 | Miller |
| 4,819,273 A * | 4/1989 | Gordon ......................... 398/110 |
| 4,824,198 A | 4/1989 | Anderton |
| 4,833,876 A | 5/1989 | Kitao et al. |
| 4,834,489 A | 5/1989 | Betzler et al. |
| 4,944,568 A | 7/1990 | Danbach et al. |

(Continued)

FOREIGN PATENT DOCUMENTS

| | | |
|---|---|---|
| AU | 199935108 | 1/2000 |
| DE | 202011004784 | 9/2011 |

(Continued)

OTHER PUBLICATIONS http://www.actaustralia.com/scorpion_tripull.html.

(Continued)

*Primary Examiner* — David Bagnell
*Assistant Examiner* — Michael Goodwin
(74) *Attorney, Agent, or Firm* — Michael Best & Friedrich LLP

(57) ABSTRACT

A chain link assembly, a cable chain assembly and a mining system. The cable handler individual links may include an enclosed section for the fiber optic cable separate from other services for the machine. A flexible material or other structure may assemble the fiber optic cable in the cable handler in a manner in which it "snakes" about the centerline to provide ample slack in the fiber optic cable to, for example, prevent over tension.

25 Claims, 10 Drawing Sheets

(56) References Cited

U.S. PATENT DOCUMENTS

| | | | |
|---|---|---|---|
| 4,962,639 A * | 10/1990 | Blase | 59/78.1 |
| 4,988,838 A | 1/1991 | Kirtland | |
| 5,048,283 A * | 9/1991 | Moritz et al. | 59/78.1 |
| 5,094,552 A | 3/1992 | Monroe et al. | |
| 5,110,189 A | 5/1992 | Haines | |
| 5,115,260 A | 5/1992 | Hayward et al. | |
| 5,138,678 A | 8/1992 | Briggs et al. | |
| 5,151,962 A | 9/1992 | Walker et al. | |
| 5,220,779 A | 6/1993 | Tatsuta et al. | |
| 5,243,814 A | 9/1993 | Hart | |
| 5,244,256 A | 9/1993 | Howard et al. | |
| 5,295,733 A | 3/1994 | Le Begue | |
| 5,321,784 A | 6/1994 | Cubukciyan et al. | |
| 5,347,603 A | 9/1994 | Belenkiy et al. | |
| 5,425,119 A | 6/1995 | Lee et al. | |
| 5,515,465 A | 5/1996 | Olin et al. | |
| 5,528,712 A | 6/1996 | Belenkiy et al. | |
| 5,550,944 A | 8/1996 | van Woesik et al. | |
| 5,553,186 A | 9/1996 | Allen | |
| 5,566,268 A | 10/1996 | Radliff et al. | |
| 5,566,269 A | 10/1996 | Eberle, Jr. et al. | |
| 5,611,012 A | 3/1997 | Kuchenbecker | |
| 5,617,501 A | 4/1997 | Miller | |
| 5,642,612 A | 7/1997 | Hughes | |
| 5,667,279 A | 9/1997 | Christopher et al. | |
| 5,710,851 A | 1/1998 | Walter et al. | |
| 5,727,097 A | 3/1998 | Lee et al. | |
| 5,745,633 A | 4/1998 | Giebel et al. | |
| 5,758,004 A | 5/1998 | Alarcon et al. | |
| 5,781,681 A | 7/1998 | Manning | |
| 5,804,765 A | 9/1998 | Siemon et al. | |
| 5,829,243 A | 11/1998 | Hughes | |
| 5,839,476 A | 11/1998 | Blase | |
| 5,845,026 A | 12/1998 | Lee et al. | |
| 5,892,871 A | 4/1999 | Dahan et al. | |
| 5,894,536 A | 4/1999 | Rifkin et al. | |
| 6,029,437 A | 2/2000 | Hart | |
| 6,134,370 A | 10/2000 | Childers et al. | |
| 6,176,072 B1 * | 1/2001 | Weber | 59/78.1 |
| 6,226,973 B1 | 5/2001 | Wehler | |
| 6,262,373 B1 | 7/2001 | Dagley et al. | |
| 6,340,249 B1 | 1/2002 | Hayes et al. | |
| 6,361,360 B1 | 3/2002 | Hwang et al. | |
| 6,387,002 B1 | 5/2002 | Gunter | |
| 6,390,688 B1 | 5/2002 | Lutzen et al. | |
| 6,434,315 B1 | 8/2002 | Grois et al. | |
| 6,434,316 B1 | 8/2002 | Grois et al. | |
| 6,464,310 B1 | 10/2002 | Burns et al. | |
| 6,496,625 B1 | 12/2002 | Falkowich et al. | |
| 6,558,046 B2 | 5/2003 | Griffis et al. | |
| 6,567,601 B2 | 5/2003 | Daoud et al. | |
| 6,600,858 B2 | 7/2003 | Lutzen et al. | |
| 6,644,753 B2 | 11/2003 | Mraz | |
| 6,672,774 B2 | 1/2004 | Theuerkorn et al. | |
| 6,729,773 B1 | 5/2004 | Finona et al. | |
| 6,741,784 B1 | 5/2004 | Guan | |
| 6,925,795 B2 | 8/2005 | Komiya | |
| 6,983,095 B2 | 1/2006 | Reagan et al. | |
| 6,983,796 B2 | 1/2006 | Bayne et al. | |
| 7,000,698 B2 | 2/2006 | Mayeu et al. | |
| 7,001,081 B2 | 2/2006 | Cox et al. | |
| 7,137,742 B2 | 11/2006 | Theuerkorn et al. | |
| 7,146,090 B2 | 12/2006 | Vo et al. | |
| 7,200,317 B2 | 4/2007 | Reagan et al. | |
| 7,244,066 B2 | 7/2007 | Theuerkorn | |
| 7,308,175 B1 | 12/2007 | Jackman et al. | |
| 7,310,936 B2 | 12/2007 | Saiki et al. | |
| 7,354,202 B1 | 4/2008 | Luger | |
| 7,451,589 B2 | 11/2008 | Howard | |
| 7,484,896 B2 | 2/2009 | DeCusatis et al. | |
| 7,641,398 B2 | 1/2010 | O'Riorden et al. | |
| 7,668,426 B2 | 2/2010 | Livingston et al. | |
| 7,677,024 B2 | 3/2010 | Utaki | |
| 7,785,017 B2 | 8/2010 | Barnes et al. | |
| 2001/0043778 A1 | 11/2001 | Griffis et al. | |
| 2002/0067894 A1 | 6/2002 | Scanzillo | |
| 2002/0150376 A1 | 10/2002 | Lutzen et al. | |
| 2002/0191939 A1 | 12/2002 | Daoud et al. | |
| 2003/0145575 A1 | 8/2003 | Mendenhall et al. | |
| 2004/0086238 A1 | 5/2004 | Finona et al. | |
| 2004/0234209 A1 | 11/2004 | Cox et al. | |
| 2005/0105873 A1 | 5/2005 | Reagan et al. | |
| 2005/0129379 A1 | 6/2005 | Reagan et al. | |
| 2005/0281510 A1 | 12/2005 | Vo et al. | |
| 2006/0045428 A1 | 3/2006 | Theuerkorn et al. | |
| 2006/0045430 A1 | 3/2006 | Theuerkorn et al. | |
| 2006/0193562 A1 | 8/2006 | Theuerkorn | |
| 2007/0140621 A1 | 6/2007 | DeCusatis et al. | |
| 2007/0241239 A1 | 10/2007 | Utaki et al. | |
| 2007/0280621 A1 | 12/2007 | Livingston et al. | |
| 2008/0226237 A1 | 9/2008 | O'Riorden et al. | |
| 2008/0251291 A1 | 10/2008 | Kadrnoska et al. | |
| 2009/0087147 A1 | 4/2009 | Barnes et al. | |
| 2010/0003002 A1 | 1/2010 | Bernard et al. | |
| 2010/0074587 A1 | 3/2010 | Loeffelholz et al. | |
| 2010/0209067 A1 | 8/2010 | Beck | |

FOREIGN PATENT DOCUMENTS

| | | |
|---|---|---|
| EP | 0725228 | 8/1996 |
| EP | 0789167 A1 | 8/1997 |
| GB | 2257492 | 1/1993 |
| GB | 2284033 | 5/1995 |
| GB | 2481690 A | 1/2012 |
| WO | WO 95/23310 | 8/1995 |
| WO | 01/48885 A1 | 7/2001 |
| WO | WO 03/095797 | 11/2003 |
| WO | WO 2007/065201 | 6/2007 |
| WO | WO 2010/132936 | 11/2010 |

OTHER PUBLICATIONS http://www.actaustralia.com/scorpion_centrepull.html.
http://www.actaustralia.com/scorpion_twinpull.html.
http://www.actaustralia.com/aconda.html.
http://www.actaustralia.com/scorpion_multipull.html.
GB1200902.3 British Search Report dated Mar. 16, 2012, 4 pages.
Search Report from the Patent Office of the Republic of Poland for Application No. P-397900 dated May 21, 2012 (2 pages).
Australian Patent Examination Report No. 1 for Application No. 2011235962 dated Aug. 22, 2013 (3 pages).

* cited by examiner

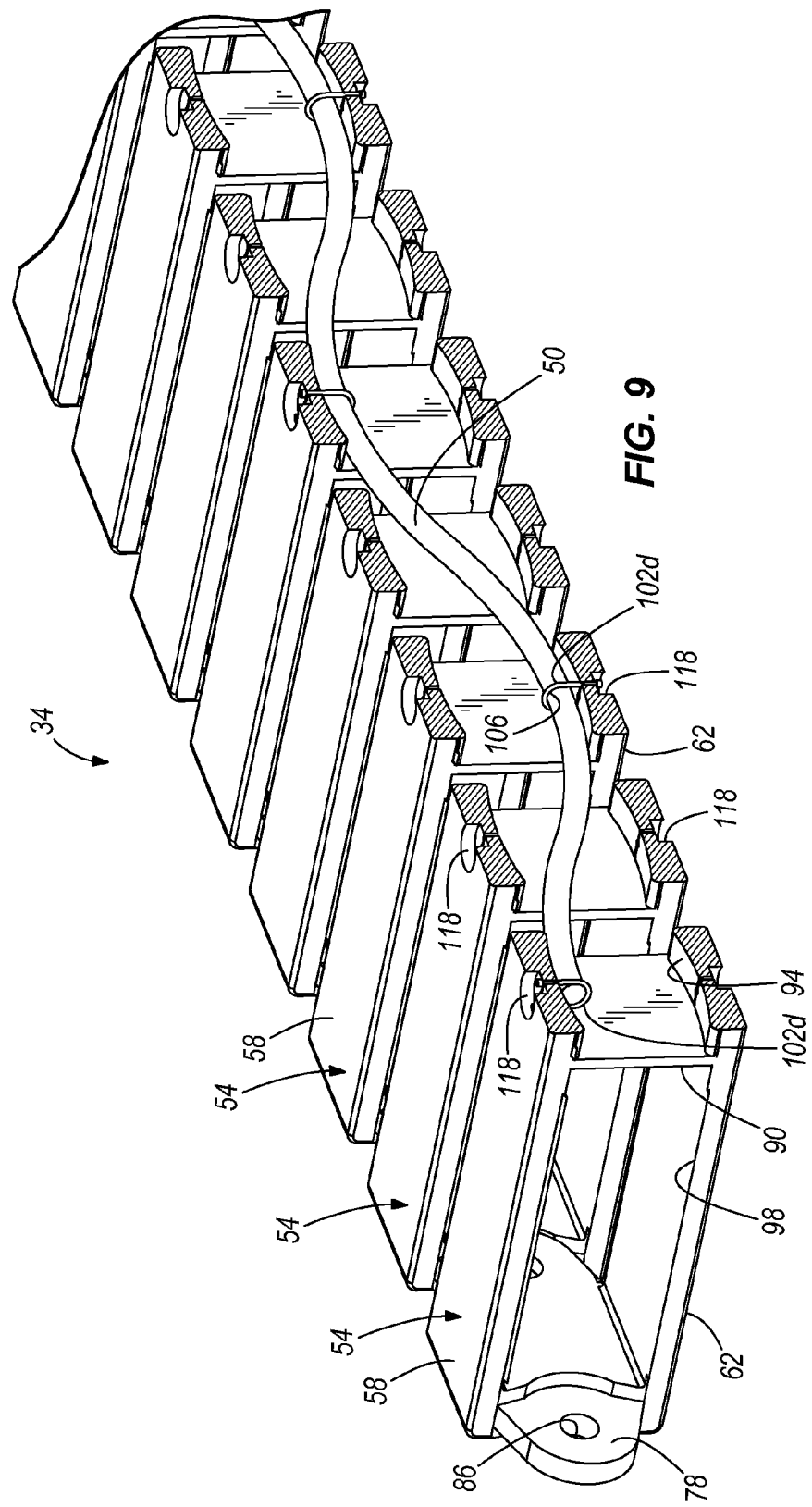

FIBER OPTIC CABLE PROTECTION IN A MINING SYSTEM

FIELD

The present invention relates to longwall mining and, more particularly, to a cable handler chain in a longwall mining installation.

SUMMARY

A longwall shearer traverses along an armoured face conveyor (AFC) pan line to win material from the face. The operation of the shearer requires electrical power for cutting and tramming as well as water for cooling machine components including electric motors and gearcases. These services are provided out-bye the longwall face and must travel along the AFC to reach the shearer. Typically, these services lay statically along the AFC until the mid point of the face where the services typically enter the cable handling system which runs in a trough to the shearer towing bracket. The towing bracket is attached to the shearer and pulls the cable handler, with services inside, along the trough. The cable handling system is designed to withstand tension caused from the weight of the system and friction as it is being towed down the cable trough, protecting the services which are not designed to withstand these forces.

The services provided to the shearer typically include only electric cables and water hoses. However, fiber optics is becoming increasingly appealing as a way to, for example, provide an unmanned face in low seam longwall mining installations or even in high seam mining. Fiber optic cores are used for high speed single- and two-way communication between the shearer and the off-face equipment. The information consists of system I/O, diagnostic information, radio control and video transmission. If fiber optic cables are used for such communications, reliability of the fiber optic cores is important. The maximum tensional load for the fiber optic cores is considerably lower than all other cables being routed to the shearer.

The illustrated constructions may provide a reliable means of transmitting the data by protecting the fiber optic cable from over tension and failure. Reliability is important as significant downtime results in lost production and revenues of the mine, and, because of difficult ergonomic conditions associated with low seam longwall mining, repairs are difficult.

In order to ensure the reliability of the fiber optic cable, the fiber optic cable may be placed in a separate compartment within the cable chain. This separate compartment may be formed by adding a divider to the chain link to create two different compartments, one for the electrical power cable/water hose and a much smaller one for the fiber optic cable. A compressible material may provide a means to assemble the fiber cable in such a way to ensure adequate slack exists over the entire length of the cable chain to prevent over tension and failure.

The separate compartment may ensure that the other larger lines cannot damage the fiber optic cable by sliding up against and over tensioning and wearing the fiber cable due to friction. The separate compartment may also provide means of constraining the compressible material in all degrees of freedom.

In one independent embodiment, a chain link assembly may generally include a chain link having a plurality of walls cooperating to define a compartment opening in the direction of the axis, a fiber optic cable being supportable in the compartment, a service line (e.g., a power cable, a water hose, etc.) being supportable in the compartment, and a flexible member supported in the compartment and engageable with the fiber optic cable, the flexible member positioning the fiber optic cable toward one of the plurality of walls.

In some constructions, the flexible member may include a compressible member supported on an opposite one of the plurality of walls. The compressible member may include a substantially solid member formed of compressible material. The compressible member may include a hollow member having a first portion engageable with the fiber optic cable and a second portion spaced from the first portion and engaging the opposite one of the plurality of walls. The hollow member may have a substantially tubular cross section. The compressible member may include a leaf spring. In some constructions, the flexible member may be connected to the one of the plurality of walls and extends at least partially around the fiber optic cable, the flexible member being in tension towards the one of the plurality of walls.

In some constructions, the chain link may further include an internal wall dividing the compartment into a first compartment and a second compartment, the fiber optic cable being supportable in the first compartment, the service line being supportable in the second compartment. The internal wall may extend between the one of the plurality of walls and an opposite one of the plurality of walls to define the first compartment on one side of the internal wall and the second compartment on the other side of the wall. The internal walls may be formed with the one of the plurality of walls and an opposite one of the plurality of walls.

The internal wall may be separate from and connected to the one of the plurality of walls and an opposite one of the plurality of walls. One of the plurality of walls may define a first groove, and the opposite one of the plurality of walls may define a second groove. The internal wall may include a first projection engageable in the first groove and a second projection engageable in the second groove to connect the internal wall to the one of the plurality of walls and to the opposite one of the plurality of walls. The internal wall may include a connecting member, a portion of the flexible member being captured between the connecting member and an opposite one of the plurality of walls.

The flexible member may have a surface engageable with the fiber optic cable, the surface including a low friction material. The surface may be coated with the low friction material. The flexible member may have a surface engageable with the fiber optic cable, the surface having curved edges.

In another independent aspect, a cable chain assembly may generally include a plurality of chain links each having a top wall, a bottom wall, a first side wall and a second side wall cooperating to define a compartment opening in the direction of the axis, a fiber optic cable extending through the compartment in each of the plurality of chain links, the fiber optic cable extending generally along a wave-shaped path, a service line supportable in the compartment in each of the plurality of chain links, a first flexible member supported in the compartment of one of the plurality of chain links and engageable with the fiber optic cable, the first flexible member positioning the fiber optic cable toward the top wall of the one of the plurality of chain links, and a second flexible member supported in the compartment a second one of the plurality of chain links and engageable with the fiber optic cable, the second flexible member positioning the fiber optic cable toward the bottom wall of the second one of the plurality of chain links.

In some constructions, a third one of the plurality of chain links may be connected between the one of the plurality of chain links and the second one of the plurality of chain links, the third one of the plurality of chain links not having a flexible member in the compartment. Each of the plurality of chain links may include a pair of forward projections and a pair of rearward projections each defining an opening, and the assembly may further include a first pin connecting the rearward projections of the one of the plurality of chain links to the forward projections of the third one of the plurality of chain links, the first pin defining a pivot axis between the one of the plurality of chain links and the third one of the plurality of chain links and a second pin connecting the rearward projections of the third one of the plurality of chain links to the forward projections of the second one of the plurality of chain links, the second pin defining a pivot axis between the third one of the plurality of chain links and the second one of the plurality of chain links.

In yet another independent embodiment, a mining system may generally include an armoured face conveyor extending along a face to be mined, the conveyor defining a cable trough, a shearer supported by and for movement along the conveyor, the shearer being operable to mine material from the face, and a cable chain assembly extending along an axis generally parallel to the face, the assembly being partially supported in the trough. The assembly may include a plurality of chain links each having a top wall, a bottom wall, a first side wall and a second side wall cooperating to define a compartment opening in the direction of the axis, a fiber optic cable extending through the compartment in each of the plurality of chain links, the fiber optic cable extending generally along a wave-shaped path, the fiber optic cable being connected to the shearer, a service line supportable in the compartment in each of the plurality of chain links, the service line being connected to the shearer, a first flexible member supported in the compartment of one of the plurality of chain links and engageable with the fiber optic cable, the first flexible member positioning the fiber optic cable toward the top wall of the one of the plurality of chain links, and a second flexible member supported in the compartment a second one of the plurality of chain links and engageable with the fiber optic cable, the second flexible member positioning the fiber optic cable toward the bottom wall of the second one of the plurality of chain links.

Independent aspects of the invention will become apparent by consideration of the detailed description and accompanying drawings.

BRIEF DESCRIPTION OF THE DRAWINGS

FIG. 9 is a perspective cross-sectional view of yet another alternative construction of the cable chain shown in FIG. 4.

DETAILED DESCRIPTION

Before any independent embodiments or independent constructions of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
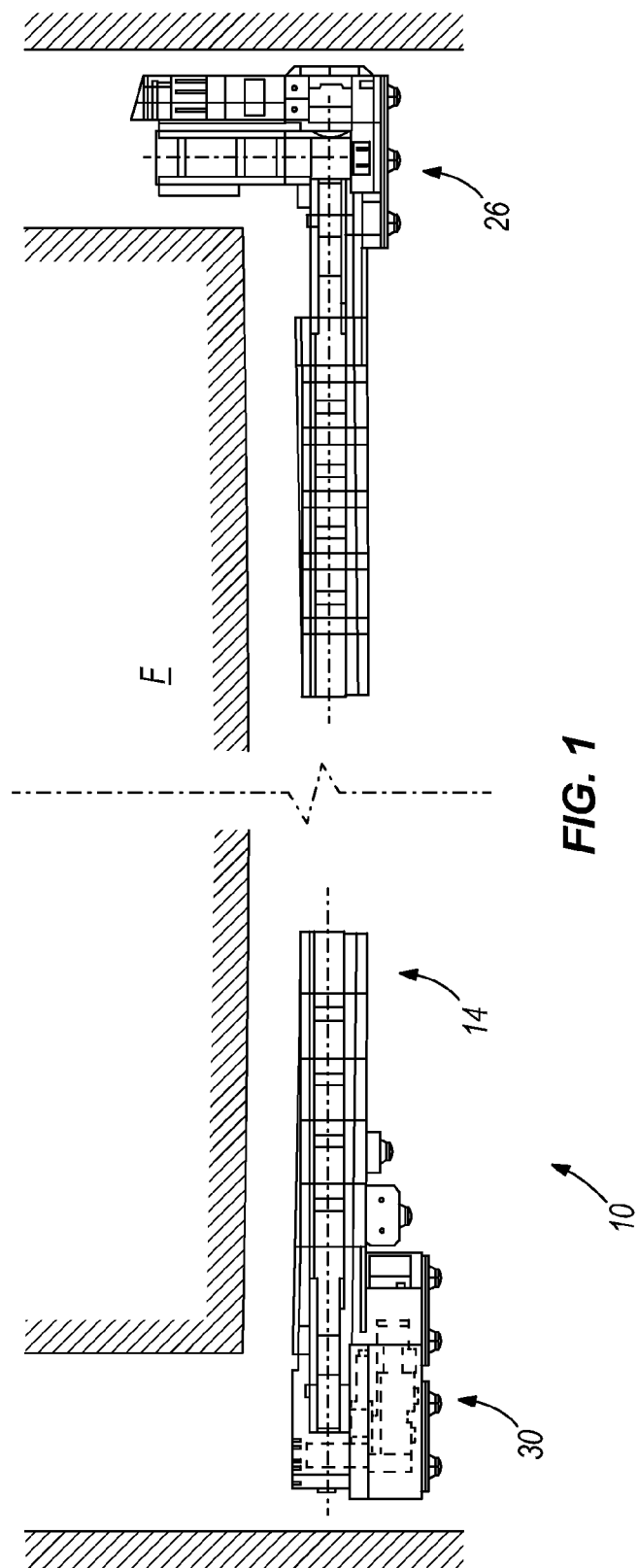
FIG. 1 is a top plan view of a longwall mining system including an Armoured Face Conveyor ("AFC").
Figure 2:
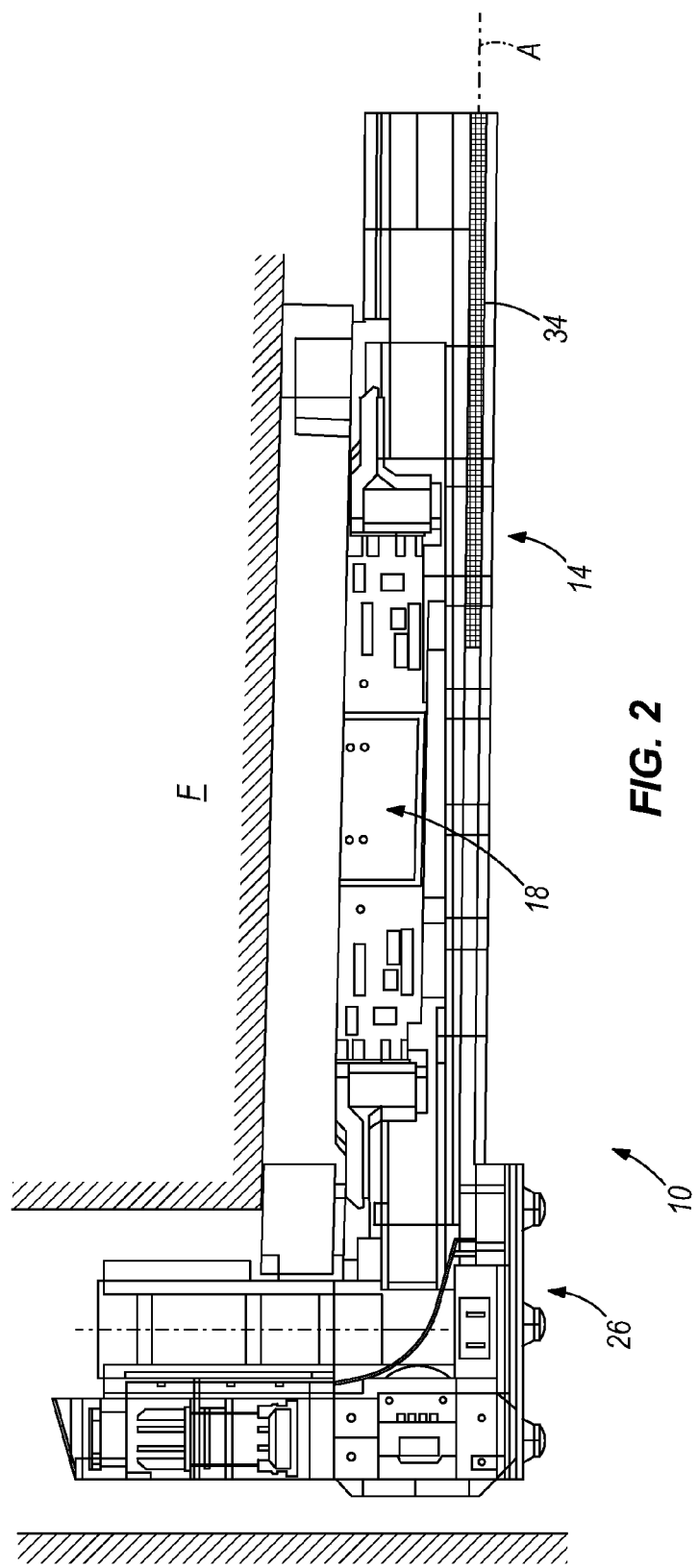
FIG. 2 is a top plan view of a portion of the longwall mining system shown in FIG. 1 including the AFC, a shearer and a cable chain.
Figure 3:
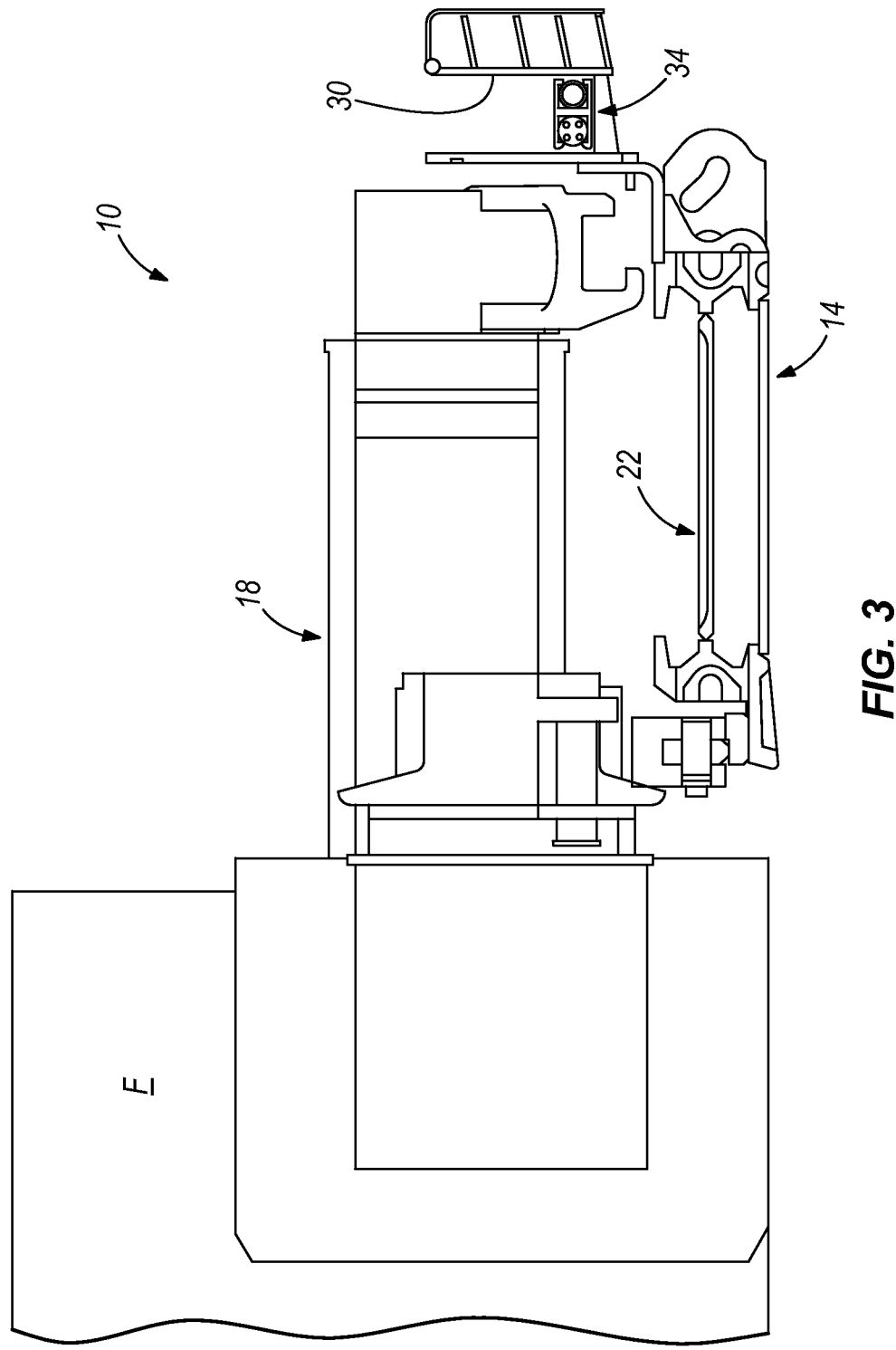
FIG. 3 is a profile view of a portion of the longwall mining system shown in FIG. 1 including the AFC, the shearer and the cable chain.

A longwall mining system 10 is illustrated in the FIGS. 1-3. The system 10 may be used in mines having a low seam or a high seam. The system 10 generally includes an Armoured Face Conveyor (AFC) 14 extending along a face F to be mined (e.g., a coal block). A shearer 18 is supported on and traverses on the pan line 22 (see FIG. 3) of the AFC 14 to win material from the face F. Head and tail drives 26, 30 (see FIG. 1) move the conveyor of the AFC 14 to convey mined material (e.g., coal). The length of this system 10 is typically around 1000 feet.

Figure 4:
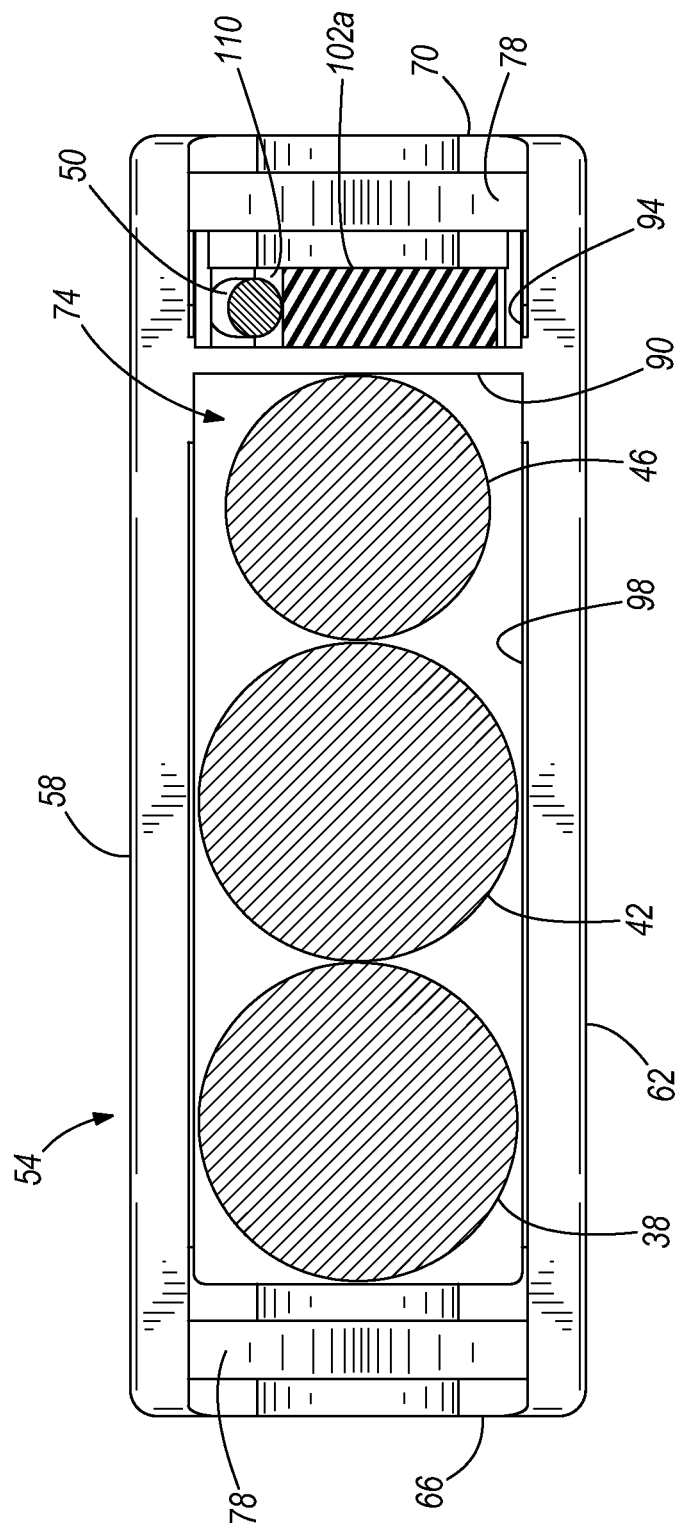
FIG. 4 is a cross-sectional view of a portion of a cable chain of the longwall mining system shown in FIG. 2.

As shown in FIGS. 2-3, the AFC 14 includes a cable trough 30 extending along an axis A generally parallel to the face F. A cable chain 34 is positioned in the cable trough 30 and extends generally along the axis A. As shown in FIG. 4, service lines (e.g., electrical power cables 38, 42, water hose 46) and a fiber optic cable 50 are supported in the cable chain 34.

Figure 5:
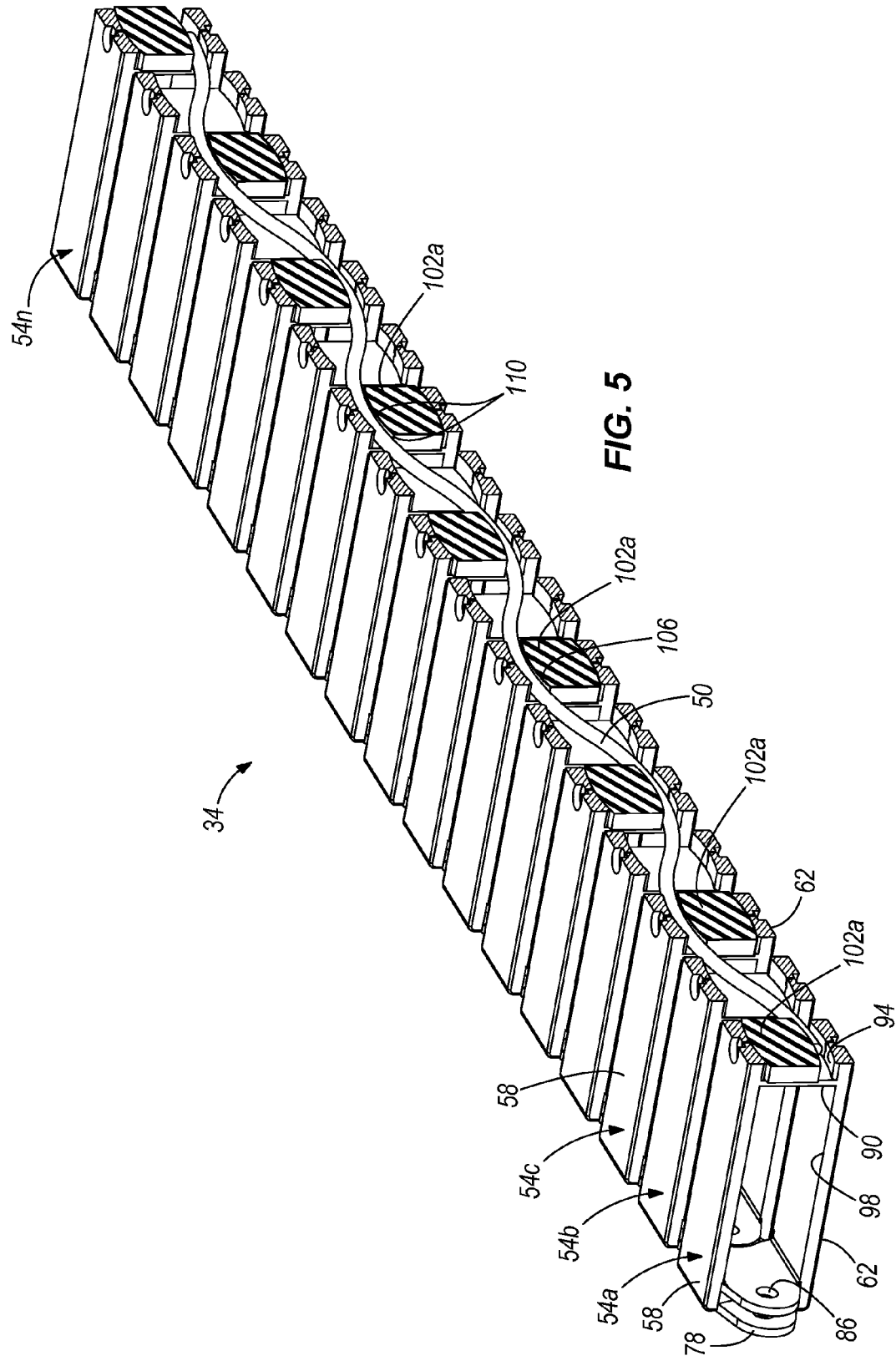
FIG. 5 is a perspective cross-sectional view of a portion of the cable chain shown in FIG. 4.
Figure 6:
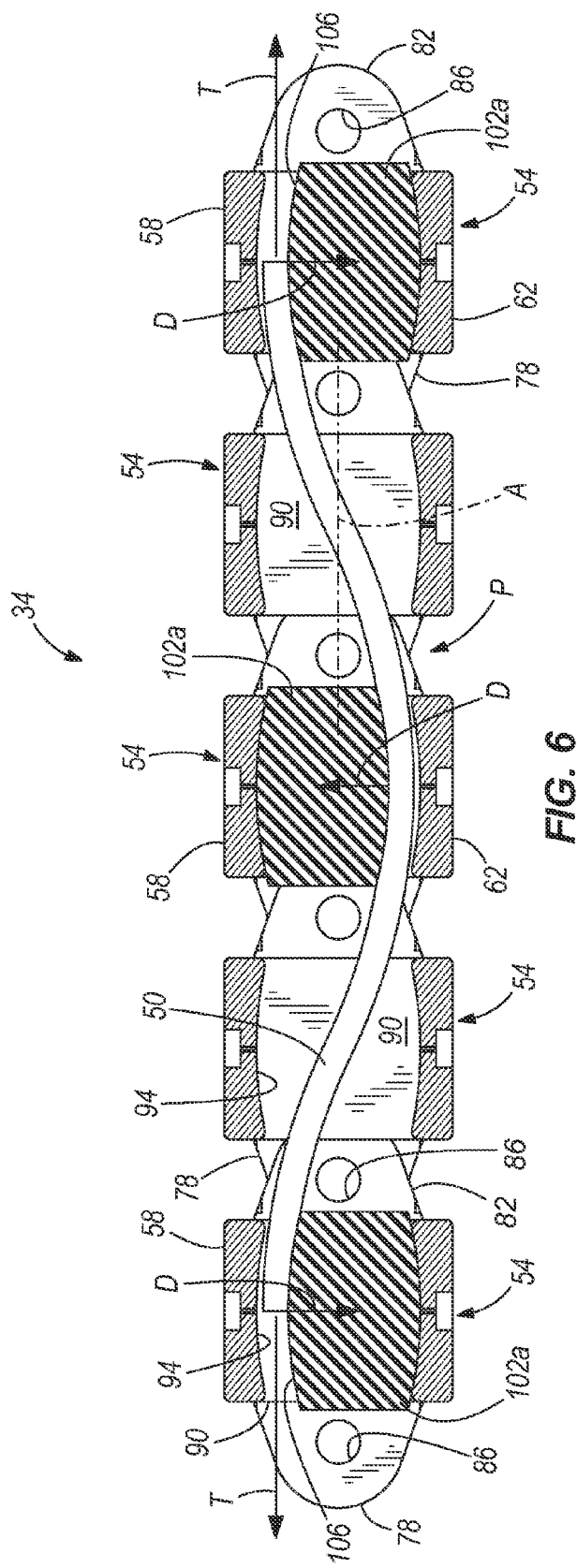
FIG. 6 is a side cross-sectional view of a portion of the cable chain shown in FIG. 4.

As shown in FIGS. 5-6, the cable chain 34 is formed from a plurality of chain links 54a, 54b, 54c . . . 54n. Each chain link 54 generally includes (see FIGS. 4-5) a plurality of walls (e.g., a top wall 58, a bottom wall 62 and opposite side walls 66, 70) defining a link compartment 74 opening in the direction of the axis A. Each chain link 54 also includes (see FIGS. 5-6) a set of forward and rearward projections 78, 82, each defining an opening 86 for receiving a pin (not shown) to connect the chain links 54 into a chain (see FIGS. 5-6).

In the illustrated construction and in some independent aspects, each chain link 54 also includes an internal divider wall 90 dividing the link compartment 74 into a first compartment 94, for the fiber optic cable 50, and a second compartment 98, for the service lines (38, 42, 46). Each compartment 94, 98 is generally rectangular with the first compartment 94 being relatively narrow in a horizontal direction (see FIG. 4). In other constructions (not shown), the compartment(s) 94, 98 may have a different shape (e.g., square, round, oval, etc.) and/or size.

Figure 4B:
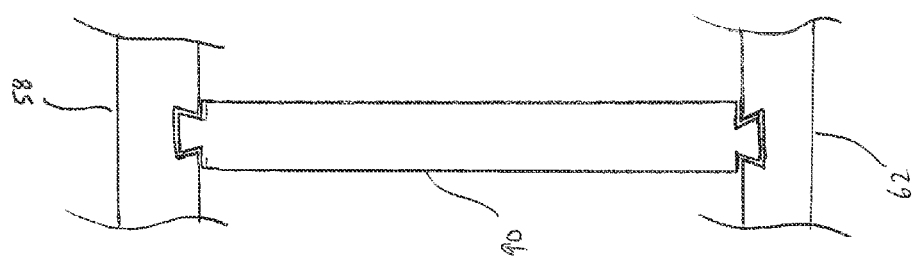
FIG. 4B is a cross-sectional view of a portion of a cable chain of a longwall mining system according to another embodiment.

In the construction shown in FIGS. 4-6 and 9, the divider wall 90 is formed with the other walls (58, 62) of the chain link 54. In other constructions (see, for example, FIGS. 4B and 5-8), the divider wall 90 is separate from the chain link 54 and connected to the top and bottom walls 58, 62 by inter-engaging connecting members (FIG. 4B) such as, for example, keying projection(s) and groove(s) on the divider wall 90 and on the walls 58, 62. The connecting members cooperate to retain the divider wall 90 in position. In such constructions, the walls 58, 62, 66, 70 of the chain link 54 may also be formed separately from one another and connected by interengaging connecting members with a friction fit, pinned, etc.

In the illustrated construction and in some independent aspects, in at least some of the chain links 54, a flexible member 102 is provided in the first compartment 94 and engages the fiber optic cable 50. Flexible members 102 are arranged along the cable chain 34 to provide a non-linear (e.g., wave-shaped) path P for the fiber optic cable 50 such that there is slack in the fiber optic cable 50 (the length of the fiber optic cable 50 in the cable chain 34 is greater than the length of the cable chain 34).

The flexible member 102 may support and locate the fiber optic cable 50 in the first compartment 94. The surface 106 of the flexible member 102 engaging the fiber optic cable 50 includes a low friction material (e.g., the flexible member 102 may be formed of low friction material and/or the surface 106 may be coated with low friction material (e.g., a slippery coating)) to limit the coefficient of friction between the flexible member 102 and fiber optic cable 50 thereby limiting the extension of the fiber optic cable 50 along its axis as the fiber optic cable 50 is tensioned. Also, the surface 106 and the edges/corners 110 of the flexible member 102 in the area of the fiber optic cable 50 are sufficiently curved/rounded to prevent damage to the fiber optic cable 50 when relative motion occurs between the flexible member 102 and the fiber optic cable 50.

In some constructions (for example, in FIGS. 4-6, in FIG. 7 and in FIG. 8), the flexible member 102 includes a compressible member such that, when the fiber optic cable 50 is pulled, compression is induced in the flexible member 102. Applying tension T on the fiber optic cable 50 causes the fiber optic cable 50 to compress the compressible member 102 in the direction of arrow D (see FIG. 6).

In the construction shown in FIGS. 4-6, the flexible member 102 includes a solid compressible member 102a formed of, for example, foam. The compressible member 102a generally occupies the majority of the first compartment 94 (e.g., the remainder of the first compartment not occupied by the fiber optic cable 50). The compressible member 102a is constructed to position the fiber optic cable 50 toward one wall (e.g., the top wall 58 of the chain link 54a, the bottom wall 62 of the chain link 54c).

Figure 4A:
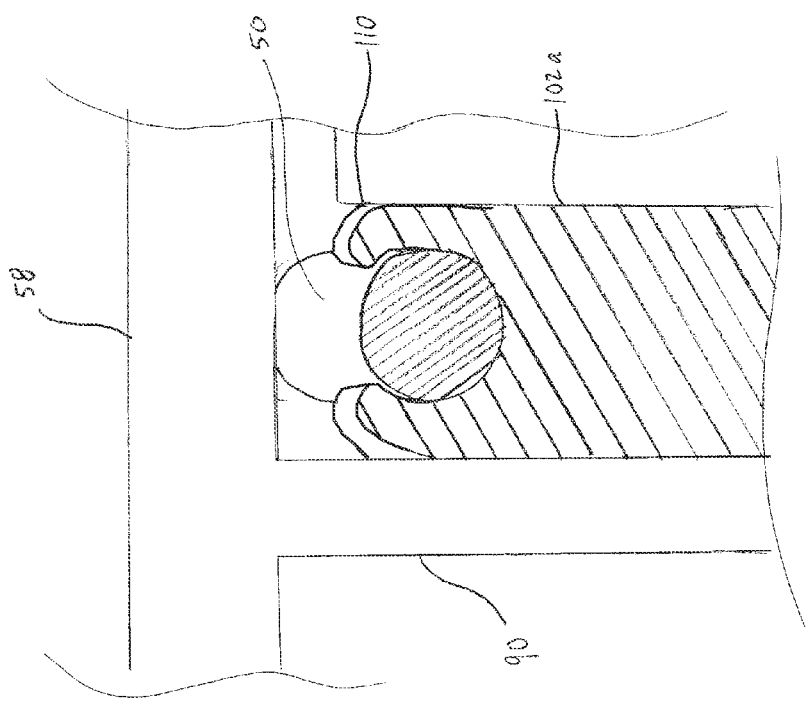
FIG. 4A is a cross-sectional view of a portion of a cable chain of a longwall mining system according to another embodiment.

In other constructions (FIG. 4A), the compressible member 102a may be constructed to at least partially encompass the fiber optic cable 50. For example, the compressible member 102a may also include a portion (FIG. 4A) between the fiber optic cable 50 and one or both of the adjacent side walls (70, 90) of the first compartment 94 and/or a portion (FIG. 4A) between the fiber optic cable 50 and the one wall (e.g., the top wall 58 of the chain link 54a, the bottom wall 62 of the chain link 54c) to at least partially fill space around the fiber optic cable 50 (see FIG. 4). In constructions in which the compressible member 102a at least partially encompasses the fiber optic cable 50, the compressible member 102a may also be sufficiently rigid such that a divider wall may not be provided to separate the fiber optic cable 50 from the service lines (38, 42, 46).

The compressible member 102a is positioned against the opposite wall (e.g., the bottom wall 62 of the chain link 54a, the top wall 58 of the chain link 54c). In the illustrated construction (see FIG. 6), the surface of the opposite wall is curved to match the shape of the adjacent surface of the compressible member 102a. However, in other constructions (not shown), the surface of the opposite wall may have a different shape (e.g., linear).

Figure 7:
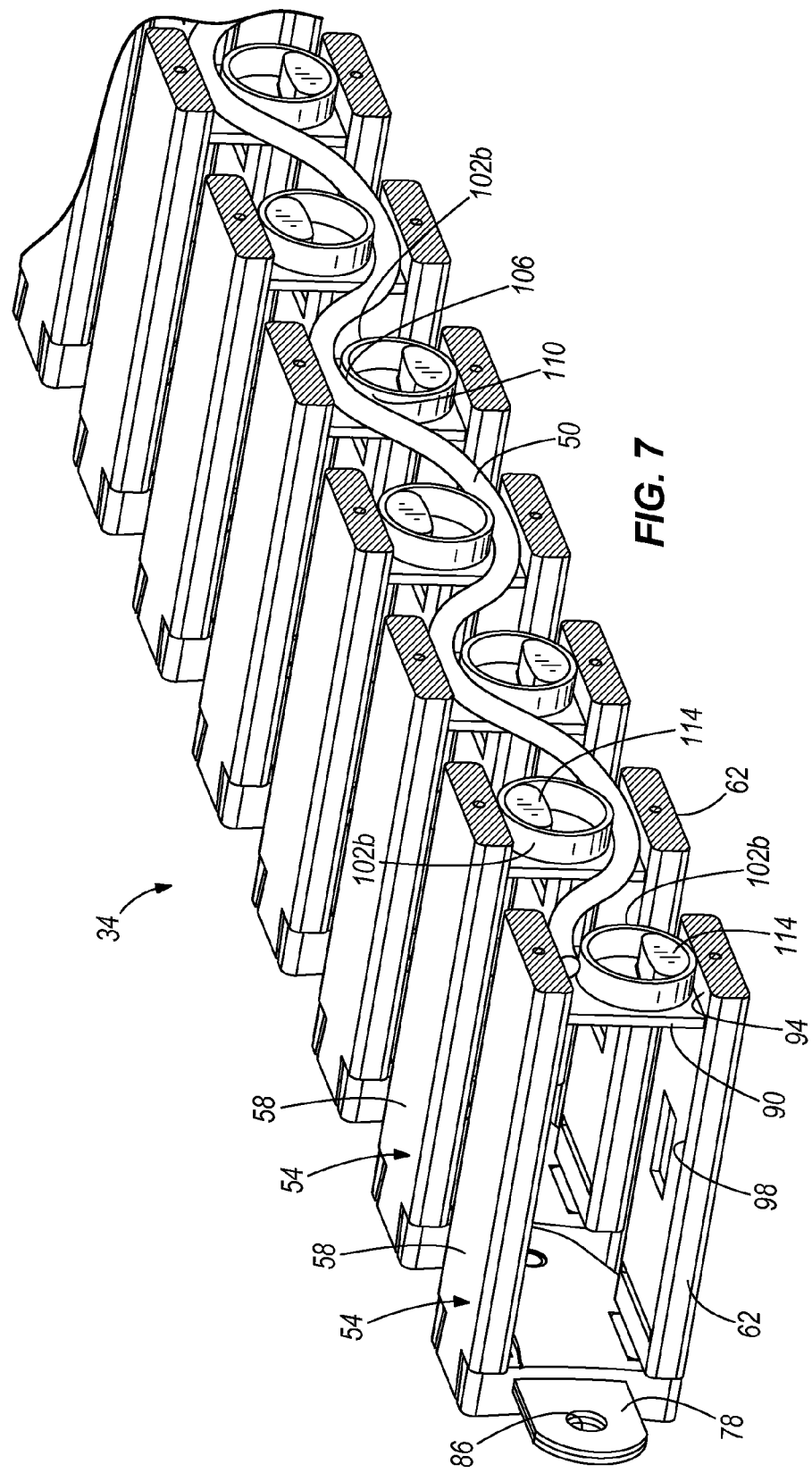
FIG. 7 is a perspective cross-sectional view of an alternative construction of the cable chain shown in FIG. 4.
Figure 8:
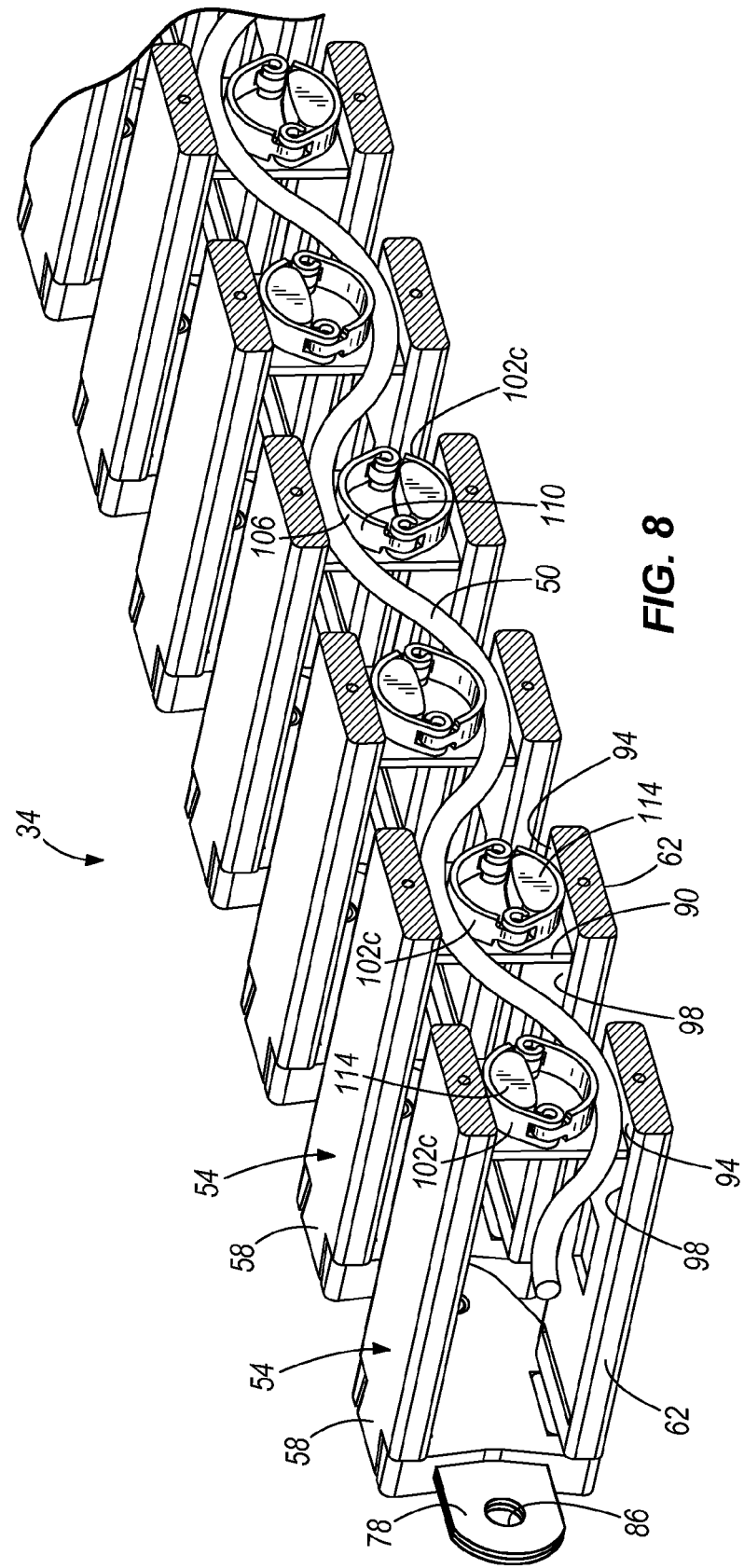
FIG. 8 is a perspective cross-sectional view of another alternative construction of the cable chain shown in FIG. 4.

In other constructions, the flexible member 102 includes a hollow compressible member, such as a hollow tubular member, that will allow the fiber optic cable 50 to deflect inwardly when subject to tension. As shown in FIG. 7, the flexible member 102 includes a hose section 102b (a short length of rubber hose). In a similar construction (see FIG. 8), the flexible member 102 includes a leaf spring 102c. The leaf spring 102c may be made of a number of materials to achieve the desired stiffness.

In the illustrated construction (see FIGS. 7-8), the divider wall 90 includes a connector 114 (e.g., a cantilevered protrusion), and the hose section 102b or the leaf spring 102c is retained by the connector 114 (e.g., between the connector 114 and the opposite wall (e.g., the bottom wall 62 of the chain link 54a, the top wall 58 of the chain link 54c)).

In a further construction, the flexible member 102 includes a tension member, such as an elastic band 102d. The band 102d is connected to the one wall (e.g., the top wall 58 of the chain link 54a, the bottom wall 62 of the chain link 54c) and extends around the fiber optic cable 50. When the fiber optic cable 50 is tensioned, taking up the slack, the band 102d will be pulled in tension as well.

The band 102d can be an open loop for easy assembly/disassembly and be fastened to the wall 58 or 62 of the chain link 54. The walls 58, 62 are provided with recessed connecting portions 118 such that the band 102d is within the outer periphery of the chain link 54 (e.g., below the top wall 58 of the chain link 54a, above the bottom wall 62 of the chain link 54c). Connecting the band 102d below flush on the outer surface of the wall 58 or 62 may protect the band 102d from becoming damaged, dislodged, etc. by external debris.

The flexible member 102 may provide one or more functions. For example, the flexible member 102 may provide a means of assembling the fiber optic cable 50 inside the cable chain 34 with a predetermined amount of slack. For example, as shown in FIG. 5, the fiber optic cable 50 may be forced by the flexible members 102 into a "sine wave" to "snake" about the neutral axis of the cable chain 34 around the flexible members 102. The fiber optic cable 50 is assembled in the manner over the entire length of the cable chain 34. FIG. 5 shows a peak-to-valley of the fiber optic cable 50 assembled in this manner over three chain links 54a, 54b, 54c. This frequency can easily be adjusted depending on different requirements in the system 10 as each chain link 54 will be able to accept and retain a flexible member 102. Adequate slack in the fiber optic cable 50 accommodates the stretching of the cable chain 34 as it is subject to tension from the shearer 18.

The flexible member 102 may provide a buffer, or cushion, when the fiber optic cable 50 is subject to tension. When the fiber optic cable 50 is subject to tension, the resilient property of the flexible member 102 will allow the "snaked" cable 50 to compress the material and deflect inwardly (see FIG. 6), providing a means to limit over-tension and premature failure of the fiber optic cable 50. The flexible member 102 may fill a void in the first compartment 94 that could otherwise be occupied by debris (which may accelerate wear or cause failure of the fiber optic cable 50).

Various independent features and independent advantages of the invention may be set forth in the following claims:

What is claimed is:
1. A chain link assembly for a cable chain assembly in a mining machine, the cable chain assembly extending along an axis, the chain link assembly comprising:
    a chain link having a plurality of walls cooperating to define a compartment opening in the direction of the axis, a fiber optic cable being supportable in the compartment, a service line being supportable in the compartment; and a flexible member supported in the compartment and engageable with the fiber optic cable, the flexible member positioning the fiber optic cable toward one of the plurality of walls;

wherein the chain link further includes an internal wall dividing the compartment into a first compartment and a second compartment, the fiber optic cable being supportable in the first compartment, the service line being supportable in the second compartment, wherein the internal wall extends between the one of the plurality of walls and an opposite one of the plurality of walls to define the first compartment on one side of the internal wall and the second compartment on the other side of the wall.

2. The chain link assembly of claim 1, wherein the flexible member includes a compressible member supported on an opposite one of the plurality of walls.

3. The chain link assembly of claim 2, wherein the compressible member includes a substantially solid member formed of compressible material.

4. The chain link assembly of claim 2, wherein the compressible member includes a hollow member having a first portion engageable with the fiber optic cable and a second portion spaced from the first portion and engaging the opposite one of the plurality of walls.

5. The chain link assembly of claim 4, wherein the hollow member has a substantially tubular cross section.

6. The chain link assembly of claim 4, wherein the compressible member includes a leaf spring.

7. The chain link assembly of claim 1, wherein the flexible member is connected to the one of the plurality of walls and extends at least partially around the fiber optic cable, the flexible member being in tension towards the one of the plurality of walls.

8. The chain link assembly of claim 1, wherein the internal wall is formed with the one of the plurality of walls and an opposite one of the plurality of walls.

9. The chain link assembly of claim 1, wherein the internal wall is separate from and connected to the one of the plurality of walls and an opposite one of the plurality of walls.

10. The chain link assembly of claim 9, wherein the one of the plurality of walls defines a first groove, and the opposite one of the plurality of walls defines a second groove, and wherein the internal wall includes a first projection engageable in the first groove and a second projection engageable in the second groove to connect the internal wall to the one of the plurality of walls and to the opposite one of the plurality of walls.

11. The chain link assembly of claim 1, wherein the internal wall includes a connector, a portion of the flexible member being captured between the connector and an opposite one of the plurality of walls.

12. The chain link assembly of claim 1, wherein the flexible member has a surface engageable with the fiber optic cable, the surface including a low friction material.

13. The chain link assembly of claim 12, wherein the surface is coated with the low friction material.

14. The chain link assembly of claim 1, wherein the flexible member has a surface engageable with the fiber optic cable, the surface having curved edges.

15. A cable chain assembly for a mining machine, the cable chain assembly extending along an axis, the assembly comprising:

a plurality of chain links each having a top wall, a bottom wall, a first side wall and a second side wall cooperating to define a compartment opening in the direction of the axis;

a fiber optic cable extending through the compartment in each of the plurality of chain links, the fiber optic cable extending generally along a wave-shaped path;

a service line supportable in the compartment in each of the plurality of chain links;

a first flexible member supported in the compartment of one of the plurality of chain links and engageable with the fiber optic cable, the first flexible member positioning the fiber optic cable toward the top wall of the one of the plurality of chain links; and a second flexible member supported in the compartment of a second one of the plurality of chain links and engageable with the fiber optic cable, the second flexible member positioning the fiber optic cable toward the bottom wall of the second one of the plurality of chain links.

16. The assembly of claim 15, wherein a third one of the plurality of chain links is connected between the one of the plurality of chain links and the second one of the plurality of chain links, the third one of the plurality of chain links not having a flexible member in the compartment.

17. The assembly of claim 15, wherein each of the first flexible member and the second flexible member includes a compressible member supported on an opposite one of the first plurality of walls.

18. The assembly of claim 17, wherein the compressible member includes a substantially solid member formed of compressible material.

19. The assembly of claim 17, wherein the compressible member includes a hollow member having a first portion engaging the fiber optic cable and a second portion spaced from the first portion and engaging the opposite one of the first plurality of walls.

20. The assembly of claim 15, wherein the first flexible member is connected to the top wall of the one of the plurality of chain links and extends at least partially around the fiber optic cable, the first flexible member being in tension towards the top wall of the one of the plurality of chain links, and wherein the second flexible member is connected to the bottom wall of the second one of the plurality of chain links and extends at least partially around the fiber optic cable, the second flexible member being in tension towards the bottom wall of the second one of the plurality of chain links.

21. The assembly of claim 15, wherein each of the plurality of chain links further include an internal wall dividing the compartment into a first compartment and a second compartment, the fiber optic cable being supported in the first compartment, the service line being supported in the second compartment.

22. The assembly of claim 21, wherein the internal wall extends between the top wall and the bottom wall to define the first compartment on one side of the internal wall and the second compartment on the other side of the wall.

23. The assembly of claim 15, wherein the flexible member has a surface engageable with the fiber optic cable, the surface including a low friction material.

24. The assembly of claim 15, wherein the flexible member has a surface engageable with the fiber optic cable, the surface having curved edges.

25. A mining system comprising:

an armoured face conveyor extending along a face to be mined, the conveyor defining a cable trough;

a shearer supported by and for movement along the conveyor, the shearer being operable to mine material from the face; and a cable chain assembly extending along an axis generally parallel to the face, the assembly being partially supported in the trough, the assembly including a plurality of chain links each having a top wall, a bottom wall, a first side wall and a second side wall cooperating to define a compartment opening in the direction of the axis, a fiber optic cable extending through the compartment in each of the plurality of chain links, the fiber optic cable extending generally along a wave-shaped path, the fiber optic cable being connected to the shearer, a service line supportable in the compartment in each of the plurality of chain links, the service line being connected to the shearer, a first flexible member supported in the compartment of one of the plurality of chain links and engageable with the fiber optic cable, the first flexible member positioning the fiber optic cable toward the top wall of the one of the plurality of chain links, and a second flexible member supported in the compartment of a second one of the plurality of chain links and engageable with the fiber optic cable, the second flexible member positioning the fiber optic cable toward the bottom wall of the second one of the plurality of chain links.

* * * * *